United States Patent Office 3,424,711
Patented Jan. 28, 1969

3,424,711
STRIPPABLE COATINGS COMPRISING ATACTIC OLEFIN COPOLYMER, DIALKYL SELENIDE AND BENZOTRIAZOLE
William W. West, El Cerrito, and Robert O. Bolt, San Rafael, Calif., assignors to Chevron Research Company, San Francisco, Calif., a corporation of Delaware
No Drawing. Filed Dec. 19, 1966, Ser. No. 602,467
U.S. Cl. 260—45.8                     10 Claims
Int. Cl. C08f 45/58; C09d 3/60

ABSTRACT OF THE DISCLOSURE

Atactic copolymers of olefins of from 2 to 4 carbon atoms used as strippable coatings to protect substrates from weathering are stabilized against degradation with dialkyl selenide, particularly in combination with N-hydroxyphenyl substituted benztriazoles.

BACKGROUND OF THE INVENTION

Field of the invention

When storing or shipping articles which may be subjected to the weather—sunlight, wind and rain—it is desirable to have a cheap, protective, easily removable coating on the article. Recently, it was found that atactic copolymers, particularly propylene and butene copolymers, when dissolved in a suitable solvent, could be sprayed onto various surfaces, e.g., paper and wood, and protect the surface from wear, abrasion and weather. As desired, the coating could be readily stripped from the surface, leaving the clean protected surface unmarred. See application Ser. No. 44,076, filed Mar. 30, 1965.

While the coatings were excellent in having good adhesion and being readily strippable, when subjected to sunlight for long periods of time, the coatings lost their desirable strength characteristics. Atactic polymers are more susceptible to the effects of light and oxygen than their stereospecific or tactic analogs. The atactic polymers, being noncrystalline, are more readily permeated by oxygen and, therefore, subjected to oxidative degradation. When the polymers became brittle and lose their tensile strength they are no longer able to afford the necessary protection to the article being protected.

Description of the prior art

Dialkyl selenides have been used as oxidation inhibitors in lubricating oils. See, for example, U.S. Patents Nos. 2,346,153–6, 2,400,106 and 2,528,346. Substituted benztriazoles are commercially available as ultraviolet stabilizers for polymers.

SUMMARY OF THE INVENTION

Pursuant to this invention, strippable polymeric coatings are provided having enhanced weatherability, by incorporating into the coating composition a dialkyl selenide, having a total of at least 16 carbon atoms, preferably in combination with a 2-(N-hydroxyphenyl) benztriazole-1,2,3. By combining either the dialkyl selenide, by itself or in combination with the hydroxyphenyl benztriazole, excellent weatherability is obtained over long periods of time, demonstrated by the significant retention of the original physical properties of the coating.

DESCRIPTION OF PREFERRED EMBODIMENTS

The dialkyl selenide has the following formula:

$$RSeR^1$$

wherein R and $R^1$ are alkyl of from 2 to 18 carbon atoms the number of carbon atoms being a total of from 16 to about 30, preferably from about 20 to 26. R and $R^1$ may be the same or different but will usually be the same. R and $R^1$ may be straight chain or branched chain.

Illustrative selenides include ethyl octadecenyl selenide, hexyl dodecyl selenide, dilauryl selenide, dimyristyl selenide, didecyl selenide, dioctyl selenide, etc.

The N-hydroxyphenyl benztriazoles will for the most part have the following formula:

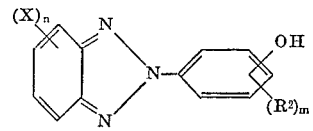

wherein $R^2$ is lower alkyl, usually methyl or tert.-butyl, X is halogen of atomic number 9 to 35, usually chlorine, m is an integer of from 0 to 2 and n is an integer of from 0 to 1. The hydroxyl, $R^2$ and X may be substituted on any annular carbon, but usually the hydroxyl will be either in the ortho or para position to the nitrogen, more usually in the ortho position. The preferred compositions are 2-(3'- or 5'-methyl-2'-hydroxyphenyl) benztriazole and 2-(3'-tert.-butyl-5'-methyl- or 3',5'-di[tert.-butyl]-2'-hydroxyphenyl)-5-chlorobenztriazoles or mixtures thereof.

The dialkyl selenides will generally be used in amounts of at least about 0.20 weight percent based on polymer and generally not exceeding 2 weight percent based on polymer. The total amount of additive (selenide and benztriazole) will generally range from about 0.4 weight percent to about 3 weight percent. The benztriazole will generally be present in from about 0.15 to 1.5 weight percent, usually being in equal weight amount to the dilauryl selenide.

The additives may be individual compounds or mixtures of compounds within the described genera.

The copolymers which are used for the coating composition are atactic copolymers of olefins of from 2 to 4 carbon atoms, i.e., ethylene, propylene and 1-butene. One monomer is present in at least 5 mole percent and usually at least 10 mole percent. Generally, the polymers will be ethylene-propylene or propylene-(butene-1) copolymers.

By predominantly atactic is meant that the polymer will be soluble in refluxing heptane. That is, at least 50 weight percent of the polymer will dissolve in refluxing heptane. Preferably, 90 weight percent will be soluble in refluxing heptane, and particularly preferred are those compositions which have at least 90 weight percent dissolved in heptane at 50° C. or below.

The molecular weight of the polymer will generally be at least 100,000 and not exceed 2,000,000, more usually from about 250,000 to 1,000,000. The viscosity of the polymer, as reported in Saybolt Universal seconds (SUS) at 210° F. (determined at a concentration of 2.8 g. of polymer in 100 g. of 130 neutral oil) will range from about 40 to 300 SUS, more usually from about 60 to 175 SUS.

The propene-butene copolymers are amply described in application Ser. No. 444,076. Usually, the ethylene in the ethylene-propylene or ethylene-(1-butene) copolymers will be present in from 25 to 75 mole percent, while correspondingly, the propylene and 1-butene will be present in from 75 to 25 mole percent. With the propylene-(1-butene) polymers, the propylene will usually be present in from 65 to 95 mole percent, more usually from 75 to 85 mole percent.

In preparing the compositions for application to the article to be coated, the polymers may be dissolved in aromatic or aliphatic hydrocarbon solvents. Illustrative solvents are benzene, toluene, heptane, hexane, octane, nonane, cyclohexane, etc. Usually, for convenience, mixed solvents will be used rather than a pure solvent. The solvents are not restricted to hydrocarbons, but also include halohydrocarbons, ethers, etc. The solvents generally have boiling points in the range of about 50° to 150° C. For the most part, aliphatic hydrocarbons are preferred of from about 6 to 9 carbon atoms, because of their availability and volatility.

In preparing the coating compositions, various additives may be added other than those of this invention. Additives which may be included are fillers, such as talc, graphite, carbon black, asphaltenes, gilsonite, etc.; soaps to enhance strippability, such as aluminum stearate; plasticizers, such as oils of lubricating viscosity; fungicides; colorants; etc. The total weight percent of the additives other than the plasticizers will generally be in the range of about 0.1 to 10 weight percent, while the plasticizer may be present in from about 1 to 30 weight percent based on polymer.

The compositions of this invention are used as solutions or slurry-solutions in various solvents. Depending on the temperature, the concentration will be in the range of 5 to 50 weight percent, more usually in the range of about 10 to 30 weight percent. The solutions or slurry-solutions may be applied in a variety of ways, e.g., dip coating, spraying, roller coating, etc.

Depending on the method of application, the temperature of application will vary from about 20° to 80° C. Any method which provides a relatively uniform coat on the base material or object may be employed. The use of the polymers of this invention, particularly at elevated temperatures, e.g., 50° C., provides relatively homogeneous solutions of relatively low viscosity, permitting the variety of methods of applying the polymers which have been described above.

The different methods of applying the coatings will affect the physical properties of the coating, e.g., adherence to the coated surface. To that extent, for some uses one method of applying will be preferred over another. It is found generally that the airless spray method (spray pattern formed by flow through orifice at 500–2000 p.s.i. pressure) at elevated temperature, e.g., 50° C., provides the best all around means of coating lumber stacks, e.g., stacks of plywood. Roller coating is useful for large areas, e.g., sheets of plywood. Dipping is preferred for odd shapes, including paper rolls, etc.

The coating application temperature affects the porosity of the coating, particularly as measured by water transmission. A cold application gives greater porosity than coating at elevated temperatures.

It is frequently advantageous to dry the coating at elevated temperatures. Depending on the solvent used, temperatures of about 125° to 175° F. will suffice over a period of 1 to 25 minutes; usually, 5 to 15 minutes is preferred. Warm air, heating lamp or other convenient means may be used to achieve the desired temperature. Usually, evaporation of only 85 to 95 weight percent of the solvent is required to obtain an acceptable nontacky surface.

The films which are applied to the base material or object will generally be of at least 0.001" thickness and generally not more than 0.050" thickness. More usually, the thickness of the film will be in the range of about 0.005 to 0.025" thickness. The desired thickness will depend on the particular material used, the method of application, etc.

The films formed by this invention adhere to the various base materials sufficiently to provide the protection required from abrasion, water, etc. However, the films do not adhere so strongly that they deface the base material, such as wood or paper, when they are stripped from it. Therefore, the polymers of this invention adhere strongly enough so that they are not readily removed by accidental physical abuse, but are readily removed without damage to the base material when stripped. The cover must also be strong enough so the stripping is convenient. That is, when stripping, the coating must come off in large sheets and not crumble or stick to the base in small bits. The coatings of this invention are cleanly and easily removed from their base materials, coming off in large continuous sheets.

The copolymers of this invention are readily prepared using "Ziegler" catalysts which do not provide high stereo-specificity. Convenient catalysts are afforded by aluminum triisobutyl and titanium trichloride. The solvents used for the polymerization may be a variety of inert solvents, particularly inert hydrocarbon solvents, both aliphatic and aromatic. It is particularly advantageous to prepare the polymer in the solvent chosen for the final application, e.g., a mixture of hydrocarbons boiling in the range of about 35° to 110° C. The pressure during the polymerization will generally be above atmospheric pressure, generally not exceeding 50 p.s.i.g. Control of the molecular weight of the polymer is most readily achieved by the use of a hydrogen pressure, when carrying out the polymerization. The methods for preparing these polymers are well known in the art and do not require extensive exemplification here.

The description of some of the compositions, their preparation and their properties have already been described in application Ser. No. 444,076, mentioned previously. The disclosure of that application is incorporated herein.

In order to demonstrate the effectiveness of incorporating the selenide composition either by itself or in combination with a hydroxyphenyl substituted benztriazole, a number of coating compositions were prepared and tested in an Atlas twin arc weatherometer (type D apparatus using a 102–18 cam; water spray at ambient temperatures) and tested according to ASTM Method D42–57. The composition contained about 18 weight percent of an 80:20 propylenebutene-1 copolymer in an essentially aliphatic solvent, boiling range 75° to 105° C. Varying amounts of the additives employed in this invention were incorporated in the composition and strip coats were formed by casting; the solution is heated to about 55° to 60° C. and poured onto a level wood surface and allowed to cool to room temperature, the solvent evaporating during cooling.

The coated wooden plaques were then placed in the weatherometer and the tensile properties of the strip coat determined after various periods of time. The tensile properties of the coating were determined in an Instron apparatus. The samples for testing were obtained by stripping the coating from the wooden base both before and after weathering and cutting the strip to the desired size. The following table indicates the results obtained.

TABLE I

| Additive in Coating | | Break Strength, p.s.i.; Elongation, Percent | | |
|---|---|---|---|---|
| Dilauryl selenide, wt. percent [1] | Hydroxyphenyl benztriazole,[2] wt. percent [1] | Weatherometer, Hours | | |
| | | 0 | 135–160 | 240–275 |
| | | 950; 400 | ([3]) | |
| 0.5 | | 990; 500 | 800; 150 | 750; 150 |
| | A, 0.5 | 750; 440 | ([3]) | |
| | B, 0.5 | 1,150; 590 | 1,000; 540 | ([3]) |
| | C, 0.5 | 1,650 | 860; 180 | ([3]) |
| 0.25 | | 870; 375 | 915; 190 | 640; 85 |
| 0.25 | A, 0.25 | 1,170; 500 | 690; 100 | |
| 0.25 | B, 0.25 | 1,500; 775 | 1,510 | 1,415; 750 |
| 0.25 | C, 0.25 | 1,015; 550 | 1,310; 600 | 1,215; 600 |

[1] Based on copolymer. [2] A=2-(2'-hydroxy-5'-methylphenyl) benztriazole; B=2-(3'-[tert.-butyl]-2'-hydroxy-5'-methylphenyl)-5-chlorobenztriazole; C=2-(3',5'-di-[tert.-butyl]-2'-hydroxyphenyl)-5-chlorobenztriazole. [3] No strength.

It is evident from the above data that the useful life of the strip coat is greatly extended by the presence of small amounts of a dialkyl selenide, particularly when used in combination with a hydroxyphenyl benztriazole. The presence of these additives greatly extends the useful lifetime of the protective coatings, permitting extended storage of items under severe weather conditions.

As will be evident to those skilled in the art, various modifications on this invention can be made or followed,

We claim:
1. A composition useful for coating various base materials to protect the coated surface from injury, from weather damage and abrasion and which coating is then readily stripped from the surface without injury to the surface, which comprises in a suitable solvent a predominantly atactic copolymer having 2 different olefins of from 2 to 4 carbon atoms, each olefin being present in at least 5 mole percent, and at least 0.25 weight percent based on copolymer of a dialkyl selenide having a total of at least 16 carbon atoms.

2. A composition according to claim 1, wherein said copolymer is a predominantly atactic propene-1-butene copolymer of from 250,000 to 2,000,000 molecular weight.

3. A composition according to claim 2, wherein from 0.15 to 1.5 weight percent based on copolymer of an N-hydroxyphenyl benztriazole is present.

4. A composition according to claim 3, wherein said N-hydroxyphenyl benztriazole is 2-(3'-methyl-2'-hydroxyphenyl) benztriazole or 2-(5'-methyl-2'-hydroxyphenyl) benztriazole.

5. A composition according to claim 3, wherein said N-hydroxyphenyl benztriazole is 2-(3'-tert.-butyl-5'-methyl-2'-hydroxyphenyl)-5-chlorobenztriazole or 2-(3',5'-di[tert.-butyl]-2'-hydroxyphenyl)-5-chlorobenztriazole.

6. A composition according to claim 1, wherein said dialkyl selenide is dilauryl selenide.

7. A method of protecting a surface subject to injury from weather damage or abrasion which comprises applying to said surface a coating having an ultimate thickness of from 0.001" to 0.05" of a composition according to claim 1.

8. An article comprising a base material and a protective film coating of from 0.001" to 0.05" thickness comprised of a predominantly atactic copolymer of 2 olefins of from 2 to 4 carbon atoms, each olefin being present in at least 5 mole percent, and wherein said copolymer is of at least 100,000 molecular weight, and from 0.20 to 2 weight percent based on copolymer of a dialkyl selenide of at least 16 carbon atoms.

9. An article according to claim 8, wherein an N-hydroxyphenyl benztriazole is present in an approximately equal weight amount to said dialkyl selenide.

10. An article according to claim 8, wherein an N-hydroxyphenyl benztriazole is present in from 0.15 to 1.5 weight percent based on copolymer.

References Cited

UNITED STATES PATENTS

| | | | |
|---|---|---|---|
| 2,528,346 | 10/1950 | Denison et al. | 252—46.3 |
| 2,927,047 | 3/1960 | Schulde et al. | 117—138.8 |
| 3,010,899 | 11/1961 | Boyer | 252—29 |
| 3,271,339 | 9/1966 | Cappuccio et al. | 260—23 |

DONALD E. CZAJA, *Primary Examiner.*

R. A. WHITE, *Assistant Examiner.*

U.S. Cl. X.R.

260—33.6, 45.7; 117—6